United States Patent
Shibata et al.

(10) Patent No.: US 11,933,739 B2
(45) Date of Patent: Mar. 19, 2024

(54) INSPECTION APPARATUS

(71) Applicant: NEC Corporation, Tokyo (JP)

(72) Inventors: Takashi Shibata, Tokyo (JP); Toru Takahashi, Tokyo (JP); Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 17/439,514

(22) PCT Filed: Mar. 26, 2019

(86) PCT No.: PCT/JP2019/012994
§ 371 (c)(1),
(2) Date: Sep. 15, 2021

(87) PCT Pub. No.: WO2020/194541
PCT Pub. Date: Oct. 1, 2020

(65) Prior Publication Data
US 2022/0155238 A1    May 19, 2022

(51) Int. Cl.
G01N 21/88 (2006.01)
H04N 23/667 (2023.01)

(52) U.S. Cl.
CPC ..... *G01N 21/8851* (2013.01); *G01N 21/8806* (2013.01); *H04N 23/667* (2023.01); *G01N 2021/8854* (2013.01)

(58) Field of Classification Search
CPC ........... G01N 21/8851; G01N 21/8806; G01N 2021/8854; G01N 2021/8809; H04N 23/667; H04N 23/64; H04N 23/90
See application file for complete search history.

(56) References Cited

U.S. PATENT DOCUMENTS 9,970,885 B2 * 5/2018 Nozawa ................... G06T 5/50
2002/0031249 A1 3/2002 Komuro et al.
(Continued)

FOREIGN PATENT DOCUMENTS

JP 2002-162368 A 6/2002
JP 2003-270163 A 9/2003
(Continued)

OTHER PUBLICATIONS

International Search Report for PCT Application No. PCT/JP2019/012994, dated Jun. 11, 2019.

*Primary Examiner* — Hung V Nguyen

(57) ABSTRACT

An image of an inspection surface of a product shot with a first imaging unit is divided into partial area images. For each partial area, a narrow-angle partial area image shot with a second imaging unit is acquired under shooting conditions in a pre-learning table in which the conditions and IDs are set. For each partial area, the narrow-angle partial area image suitable for inspection is selected, an inspection image is generated, and an anomaly of the inspection surface is detected based on the inspection image. For each partial area, whether each condition is effective is determined based on a frequency of the ID included by the inspection image. For each partial area, whether a predetermined condition is established is determined, and, with respect to the partial area in which the predetermined condition is established, a post-learning table is established in which only the condition determined to be effective is set.

11 Claims, 15 Drawing Sheets

(56) References Cited

U.S. PATENT DOCUMENTS

| | | | |
|---|---|---|---|
| 2002/0060789 A1* | 5/2002 | Fukazawa | G01N 21/9501 356/237.2 |
| 2006/0238753 A1 | 10/2006 | Tsuji et al. | |
| 2007/0279515 A1 | 12/2007 | Miyazaki et al. | |

FOREIGN PATENT DOCUMENTS

| | | |
|---|---|---|
| JP | 2005-091049 A | 4/2005 |
| JP | 2006-300775 A | 11/2006 |
| JP | 2006-322731 A | 11/2006 |
| JP | 2007-155455 A | 6/2007 |
| JP | 2007-298381 A | 11/2007 |
| JP | 2008-298693 A | 12/2008 |
| WO | 01/071323 A1 | 9/2001 |

* cited by examiner

FIG. 4

| SHOOTING CONDITION ID | CAMERA CONDITION | ILLUMINATION CONDITION |
|---|---|---|

FIG. 6

| PARTIAL AREA ID | SHOOTING CONDITION ID | EFFECTIVENESS | ... |

INSPECTION APPARATUS

This application is a National Stage Entry of PCT/JP2019/012994 filed on Mar. 26, 2019, the contents of all of which are incorporated herein by reference, in their entirety.

TECHNICAL FIELD

The present invention relates to an inspection apparatus, an inspection method, and a recording medium.

BACKGROUND ART

In general, a product manufactured in a factory or the like is inspected for an anomaly such as a flaw of the surface of the product. As a system that performs an automated inspection, various techniques for detecting an anomaly of an object based on the result of analyzing an image of the object have been proposed or put into practical use.

For example, Patent Document 1 describes a technique for detecting various flaws by acquiring a plurality of images obtained by shooting the surface of an object from different shooting directions and analyzing the images. Patent Document 1 also describes a device for increasing the accuracy of an inspection by illuminating the surface of an object from different directions and changing the direction of the illumination from front to back and from side to side to acquire images from a plurality of directions.

Patent Document 1: Japanese Unexamined Patent Application Publication No. JP-A 2007-155455

The accuracy of an inspection can be increased by shooting an object under various shooting conditions such as different directions to illuminate the object and different directions to shoot the object. However, as the kinds of shooting conditions increase, an average inspection time per object becomes longer. If the number of shooting conditions is reduced in order to shorten the average inspection time, the accuracy of an inspection decreases. Moreover, if a suitable shooting condition is determined by pre-adjustment from among various shooting conditions, the accuracy of an inspection can be increased and the average inspection time can be shortened, but it requires the cost for pre-adjustment. Therefore, it has been difficult to satisfy all of increase of the accuracy of an inspection, shortening of the average inspection time, and reduction of the cost for pre-adjustment.

An object of the present invention is to provide an inspection apparatus that solves the abovementioned problem.

SUMMARY

An inspection apparatus according to an aspect of the present invention includes: a changing unit configured to change a condition for shooting an object to various shooting conditions; a shooting condition selecting unit configured to select all of the various shooting conditions in inspection of the object executed before a predetermined condition is established, and select one or a plurality of shooting conditions from the various shooting conditions based on effectiveness of each of the shooting conditions in inspection of the object executed after the predetermined condition is established; an image acquiring unit configured to control the changing unit and thereby acquire an image of the object under each of the selected shooting conditions; an anomaly detecting unit configured to detect an anomaly of the object based on the acquired image; and an effectiveness updating unit configured to update the effectiveness based on the acquired image.

Further, an inspection method according to another aspect of the present invention includes: selecting all of various shooting conditions in inspection of an object executed before a predetermined condition is established, and select one or a plurality of shooting conditions from the various shooting conditions based on effectiveness of each of the shooting conditions in inspection of the object executed after the predetermined condition is established; acquiring an image of the object under each of the selected shooting conditions; detecting an anomaly of the object based on the acquired image; and updating the effectiveness based on the acquired image.

Further, on a non-transitory computer-readable recording medium according to another aspect of the present invention, a program is recorded. The program includes instructions for causing a computer to perform: a process of selecting all of various shooting conditions in inspection of an object executed before a predetermined condition is established, and select one or a plurality of shooting conditions from the various shooting conditions based on effectiveness of each of the shooting conditions in inspection of the object executed after the predetermined condition is established; a process of acquiring an image of the object under each of the selected shooting conditions; a process of detecting an anomaly of the object based on the acquired image; and a process of updating the effectiveness based on the acquired image.

With the configurations as described above, the present invention enables increase of the accuracy of an inspection, shortening of the average inspection time, and reduction of the cost for pre-adjustment.

BRIEF DESCRIPTION OF DRAWINGS

FIG. 4 is a view showing a format example of an entry of a pre-learning shooting condition table in the inspection apparatus according to the first example embodiment of the present invention;

FIG. 6 is a view showing a format example of an entry of an effectiveness table in the inspection apparatus according to the first example embodiment of the present invention;

EXAMPLE EMBODIMENTS

Next, example embodiments of the present invention will be described in detail with reference to the drawings.

First Example Embodiments

Figure 1:
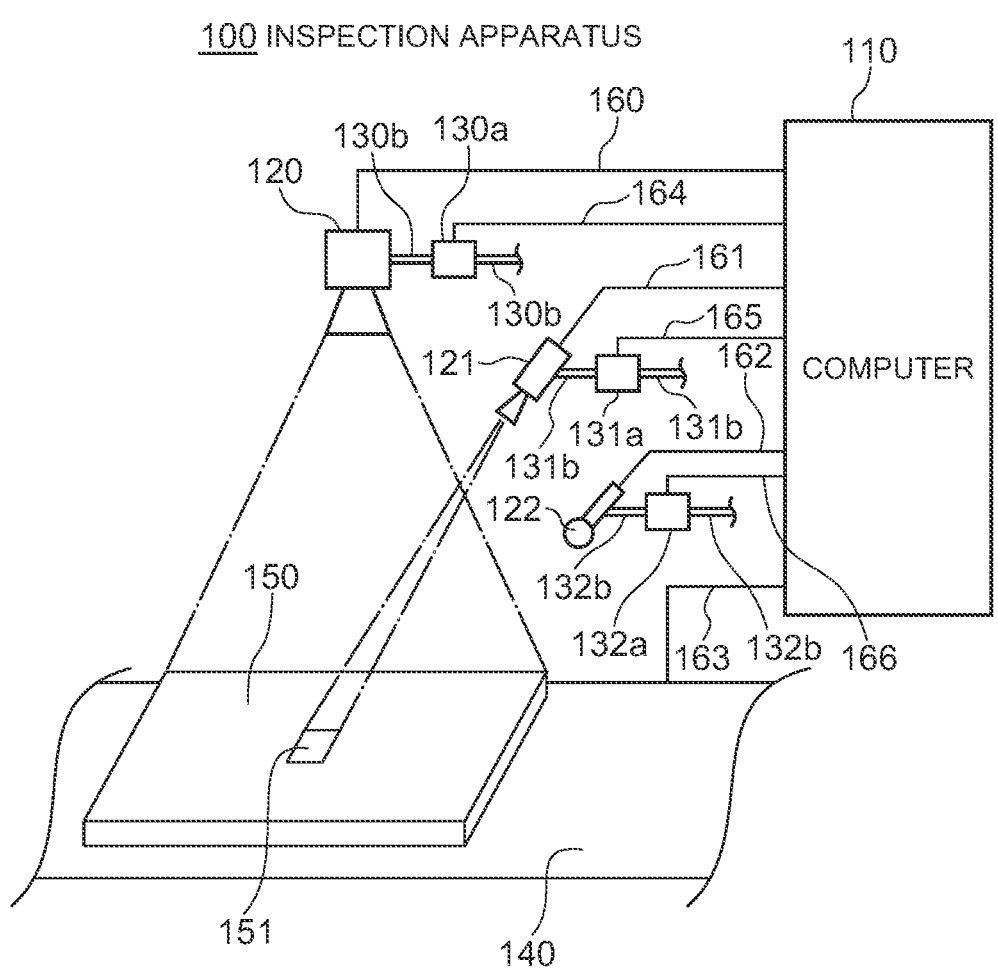
FIG. 1 is a view showing a configuration example of an inspection apparatus according to a first example embodiment of the present invention.

FIG. 1 is a view showing a configuration example of an inspection apparatus 100 according to a first example embodiment of the present invention. Referring to FIG. 1, the inspection apparatus 100 includes a computer 110, a wide-angle camera 120, a high-speed camera 121, an illuminator 122, robot arms 130 to 132, and a conveyor belt 140.

The wide-angle camera 120 is an imaging device that captures the entire upper surface of a product 150 to be inspected at a wide angle with a predetermined image resolution. The product 150 is an industrial product, such as a personal computer or a mobile device or a part thereof, mass-produced by the same manufacturing process. The inspection apparatus 100 inspects the upper surface of the product 150 for an anomaly such as a flaw. The upper surface of the product 150 has, for example, a rectangular shape having a side of about several tens of centimeters. The wide-angle camera 120 may be, for example, a digital camera including a CCD (Charge-Coupled Device) image sensor or a CMOS (Complementary MOS) image sensor having a pixel capacity of about millions of pixels. Moreover, the wide-angle camera 120 may be a black-and-white camera, or may be a color camera. The wide-angle camera 120 is supported by the robot arm 130. Moreover, the wide-angle camera 120 is connected to the computer 110 by a cable 160. However, the wide-angle camera 120 may be connected to the computer 110 by wireless communication.

The high-speed camera 121 is an imaging device that captures a partial area 151 set on the upper surface of the product 150 at a narrow angle with a high image resolution. The partial area 151 corresponds to one block of a plurality of blocks obtained by dividing an upper surface image of the product 150 shot with the wide-able camera 120. The partial area 151 has, for example, a rectangular shape having a side of several centimeters. The high-speed camera 121 may be, for example, a high-speed camera that includes a CCD image sensor or a CMOS image sensor having a pixel capacity of about millions of pixels. Moreover, the high-speed camera 121 may be a black-and-white camera, or may be a color camera. The high-speed camera 121 is supported by the robot arm 131. Moreover, the high-speed camera 121 is connected to the computer 110 by a cable 161. However, the high-speed camera 121 may be connected to the computer 110 by wireless communication.

The illuminator 122 is an illuminating device that irradiates the partial area 151 of the product 150 with illumination light. The illuminator 122 is formed by, for example, a point light source. However, the illuminator 122 is not limited to a point light source, and may be a surface light source, a ring-shaped light source, or a linear light source. The illuminator 122 is supported by the robot arm 132. Moreover, the illuminator 122 is connected to the computer 110 by a cable 162.

The robot arm 130, the robot arm 131 and the robot arm 132 include a plurality of arms 130b, a plurality of arms 131b and a plurality of arms 132b connected by a plurality of joints 130a, a plurality of joints 131a and a plurality of joints 132a (only one of the joints is shown in FIG. 1, respectively). The robot arms 130 to 132 are connected to the computer 110 by cables 164 to 166. The robot arms 130 to 132 adjust the positions and postures of the wide-angle camera 120, the high-speed camera 121 and the illuminator 122 by adjusting arm angles with the joints 130a to 132a as fulcrums in accordance with a command from the computer 110.

The conveyor belt 140 is a transporting means for transporting the product 150 to be inspected to an inspection site. The conveyor belt 140 is connected to the computer 110 by a cable 163. A plurality of products 150 are placed at regular intervals on the conveyor belt 140 and, when an inspection of one of the products 150 ends, the next one of the products 150 is transported to a predetermined inspection site.

The computer 110 is configured to control the robot arms 130 to 132, the wide-angle camera 120, the high-speed camera 121, the illuminator 122, and the conveyor belt 140. The computer 110 is configured to control the conveyor belt 140 and thereby position the product 150 to be inspected. Moreover, the computer 110 controls the robot arm 130 and thereby adjust the position and shooting direction of the wide-angle camera 120. Moreover, the computer 110 controls the robot arm 131 and thereby adjust the position and shooting direction of the high-speed camera 121. Moreover, the computer 110 controls the robot arm 132 and thereby adjusts the position and irradiation direction of the illuminator 122. Moreover, the computer 110 is configured to acquire an image of the product 150 shot with the wide-angle camera 120. Moreover, the computer 110 is configured to acquire an image of the product 150 shot with the high-speed camera 121. Moreover, the computer 110 is configured to detect an anomaly of a detection surface of the product 150 based on the image of the product 150 acquired from the high-speed camera 121. Moreover, the computer 110 is configured to present the result of anomaly detection to an operator. Moreover, the computer 110 is configured to update effectiveness for each shooting condition based on the image of the product 150 acquired from the high-speed camera 121. Moreover, the computer 110 is configured to narrow down shooting conditions used for the inspection based on the abovementioned effectiveness when a predetermined condition is established.

Figure 2:
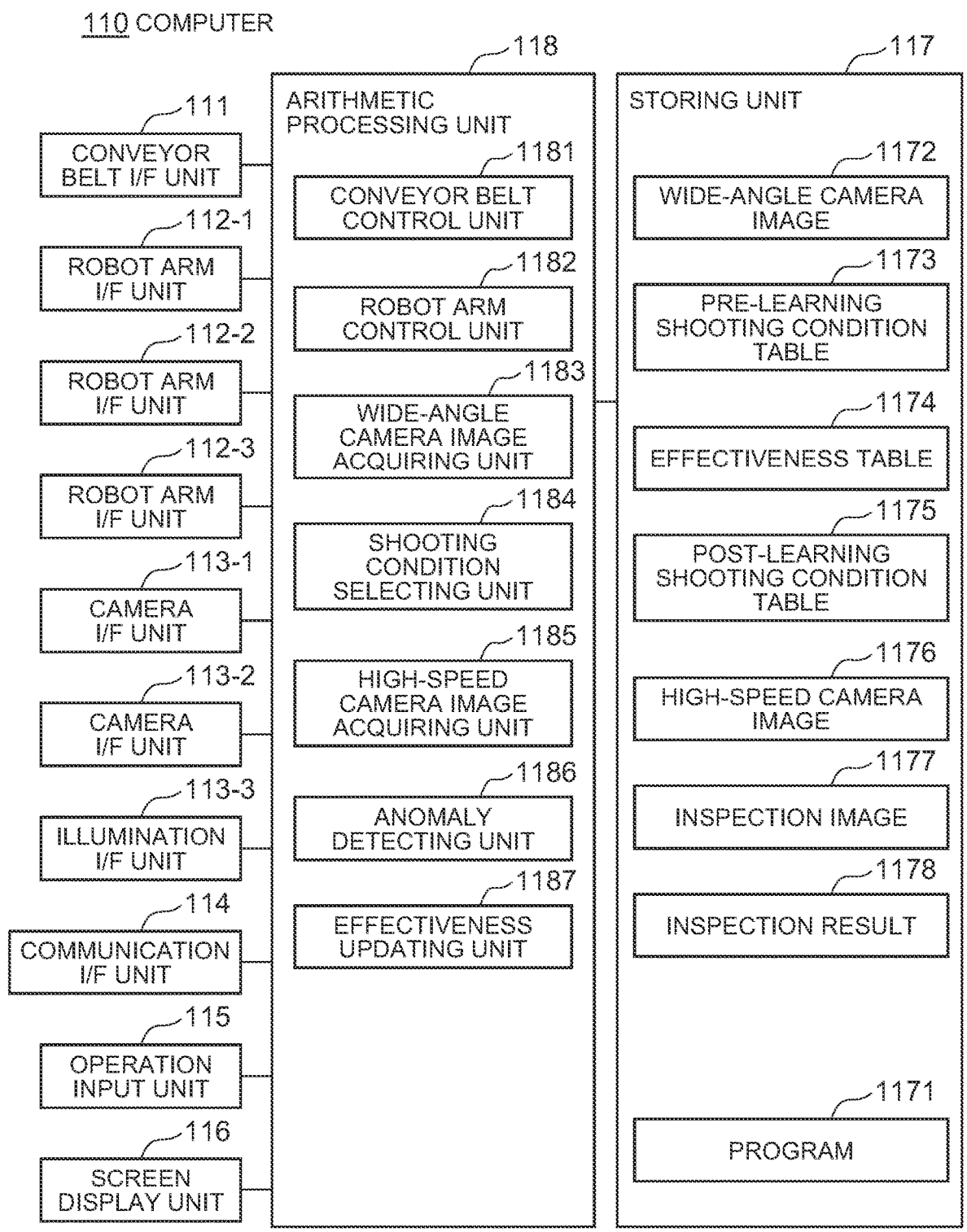
FIG. 2 is a block diagram showing an example of a configuration of a computer in the inspection apparatus according to the first example embodiment of the present invention.

FIG. 2 is a block diagram showing an example of a configuration of the computer 110. Referring to FIG. 2, the computer 110 includes a conveyor belt I/F (interface) unit 111, robot arm I/F units 112-1 to 112-3, camera I/F units 113-1 to 113-2, an illumination I/F unit 113-3, a communication I/F unit 114, an operation input unit 115, a screen display unit 116, a storing unit 117, and an arithmetic processing unit 118.

The conveyor belt I/F unit 111 is configured to perform transmission and reception of data between the conveyor belt 14o and the arithmetic processing unit 118 by the cable 163. The robot arm I/F units 112-1 to 112-3 are configured to perform transmission and reception of data between the robot arms 130 to 132 and the arithmetic processing unit 118 by the cables 164 to 166. The camera I/F units 113-1 and 113-2 are connected to the wide-angle camera 120 and the high-speed camera 121 by the cables 160 and 161, and configured to perform transmission and reception of data between the wide-angle camera 120 and the arithmetic processing unit 118 and between the high-speed camera 121 and the arithmetic processing unit 118. The illumination I/F unit 113-3 is connected to the illuminator 122 by the cable 162, and configured to perform transmission and reception of control signals between the illuminator 122 and the arithmetic processing unit 118. The communication I/F unit 114 is formed by a data communication circuit, and is configured to perform data transmission with an external device (not shown) by wired or wireless communication. The operation input unit 115 is formed by an operation input device such as a keyboard and a mouse, and is configured to detect an operator's operation and output to the arithmetic processing unit 118. The screen display unit 116 is formed by a screen display device such as an LCD (Liquid Crystal Display), and is configured to display, on its screen, various information such as an inspection result screen in accordance with an instruction from the arithmetic processing unit 118.

The storing unit 117 is formed by a storage device such as a hard disk and a memory, and configured to store therein processing information and a program 1171 necessary for various processing by the arithmetic processing unit 118. The program 1171 is a program loaded to and executed by the arithmetic processing unit 118 to realize various processing units, and is loaded in advance from an external device or a recording medium, which are not shown, via a data input/output function such as the communication I/F unit 114 and stored into the storing unit 117. Major processing information stored in the storing unit 117 includes a wide-angle camera image 1172, a pre-learning shooting condition table 1173, an effectiveness table 1174, a post-learning shooting condition table 1175, a high-speed camera image 1176, an inspection image 1177, and an inspection result 1178.

Figure 3:
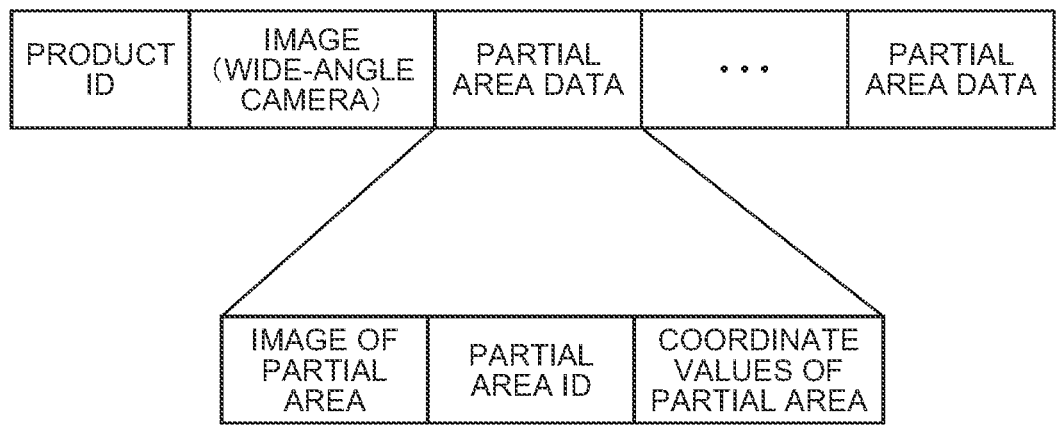
FIG. 3 is a view showing a format example of a wide-angle camera image in the inspection apparatus according to the first example embodiment of the present invention.

The wide-angle camera image 1172 includes an image shot with the wide-angle camera 120. FIG. 3 shows an example of a format of the wide-angle camera image 1172. The wide-angle camera image 1172 of this example includes an ID of the product 150 (a product ID), an image of the upper surface of the product 150 shot with the wide-angle camera 120, and a plurality of partial area data. Each of the partial area data includes an image of a partial area, an ID of the partial area (a partial area ID), and coordinate values specifying the location of the partial area. The image of the partial area is an image of a partial area of a plurality of partial areas obtained by dividing the image of the upper surface of the product 150. The coordinate values of the partial area are, for example, given as XYZ coordinate values of respective vertexes of a rectangular forming the partial area. The XYZ coordinate values include an X coordinate value, a Y coordinate value, and a Z coordinate value of three-dimensional coordinates set beforehand in a real space.

The pre-learning shooting condition table 1173 is a table that defines various shooting conditions set beforehand to be used when shooting the product 150 with the high-speed camera 121. FIG. 4 shows an example of a format of one of entries (one of rows) composing the pre-learning shooting condition table 1173. In this example, one entry of the pre-learning shooting condition table 1173 includes an ID of a shooting condition (a shooting condition ID), a camera condition determining the position and direction of the high-speed camera 121, and an illumination condition determining the position and direction (irradiation direction) of the illuminator 122.

Figure 5:
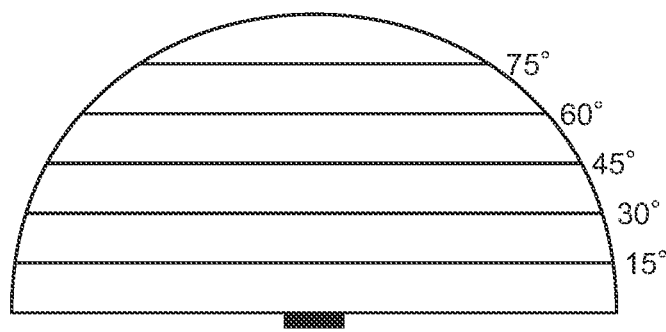
FIG. 5 is a schematic view for describing various shooting conditions defined in the pre-learning shooting condition table in the inspection apparatus according to the first example embodiment of the present invention.
Figure 5:
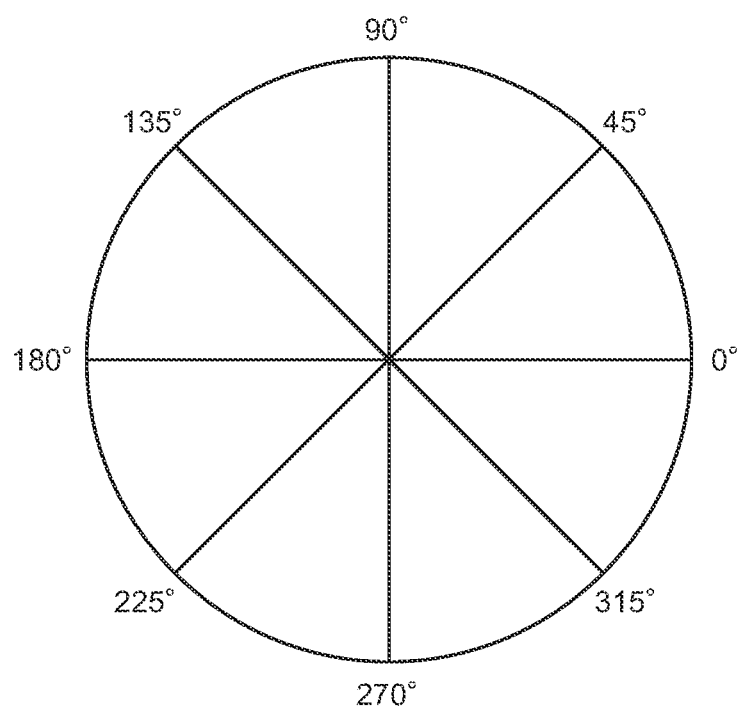

FIG. 5 is a schematic view for describing various shooting conditions defined by the pre-learning shooting condition table 1173. As shown in FIG. 5, a virtual hemisphere centered on the partial area 151 to be actually inspected of the product 150 and having an equatorial plane parallel to the upper surface of the product 150 will be considered. Moreover, longitude lines that divide the longitude of the hemisphere from 0 degrees to 360 degrees at predetermined widths (for example, 1 degree) and latitude lines that divide the latitude from 0 degrees to 90 degrees at predetermined widths (for example, 1 degree) are drawn. An example of various positions of the illuminator 122 can be all of the intersections of the longitude lines and the latitude lines described above. Moreover, all the irradiation directions of the illuminator 122 at the respective positions can be directions to the center of the hemisphere. However, since the partial area 151 cannot be illuminated by the illuminator 122 at a latitude of 0 degrees, a lower limit (for example, 1 degree to several degrees) may be set for the latitude.

Further, various positions of the high-speed camera 121 when the illuminator 122 is positioned at the intersection of a certain longitude line and a certain latitude line can be all the intersections of the longitude line and the latitude line. Moreover, all the shooting directions of the high-speed camera 121 at the respective positions can be directions to the center of the hemisphere. However, since the partial area 151 cannot be shot with the high-speed camera 121 at a latitude of 0 degrees, a lower limit (for example, 1 degree to several degrees) may be set for the latitude. Since it is impossible by the direct illumination method to make the high-speed camera 121 and the illuminator 122 capture and illuminate from the same direction, the intersection within a predetermined distance from the position of the illuminator 122 may be excluded from the positions to place the high-speed camera 121. The various positions of the high-speed camera 121 and the illuminator 122 are not limited to the above. The interval between the longitude line and the latitude line may be not 1 degree but 2 degrees or more. Moreover, the high-speed camera 121 and the illuminator 122 do not have to be on the same hemispherical surface, and the high-speed camera 121 may be placed on the surface of one of two hemispheres having different radii and the illuminator 122 may be placed on the surface of the other.

The effectiveness table 1174 is a table to store effectiveness of each of the shooting conditions defined by the pre-learning shooting condition table 1173. The effectiveness table 1174 is prepared for each partial area 151. FIG. 6 shows an example of a format of the effectiveness table 1174 corresponding to one partial area. In this example, the effectiveness table 1174 includes an ID of the partial area 151. Moreover, the effectiveness table 1174 has as many sets of shooting condition IDs and effectiveness as the number of shooting conditions. For example, as the value is larger, effectiveness is preferable as a shooting condition. The initial values of the effectiveness of all the shooting conditions are 0. As the learning progresses, the effectiveness of the shooting condition suitable for inspection is incremented.

The post-learning shooting condition table 1175 is a table to store some shooting conditions selected from among the shooting conditions defined by the pre-learning shooting condition table 1173. The post-learning shooting condition table 1175 is prepared for each partial area 151. The post-learning shooting condition table 1175 corresponding to one partial area 151 includes a partial area ID and one or more shooting condition IDs.

Figure 7:
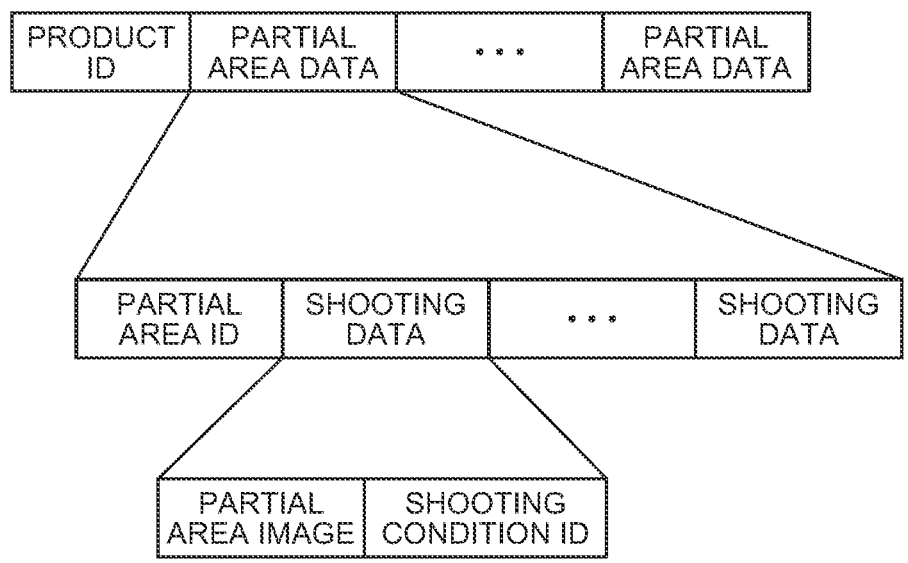
FIG. 7 is a view showing a format example of a high-speed camera image in the inspection apparatus according to the first example embodiment of the present invention.

The high-speed camera image 1176 is an image shot with the high-speed camera 121. FIG. 7 shows an example of a format of the high-speed camera image 1176. The high-speed camera image 1176 in this example includes a product ID and data for each partial area 151 (partial area data). One partial area data includes a partial area ID and one or more shooting data. One shooting data includes a partial area image and a shooting condition ID. Thus, the high-speed camera image 1176 is associated with a partial area image shot with the high-speed camera 121, a product ID, a partial area ID, and a shooting condition ID.

As described with reference to FIG. 5, the high-speed camera 121 captures the product 150 from every angle. Therefore, even if the upper surface image of the product 150 shot with the wide-angle camera 120 is divided into a plurality of rectangular partial areas 151, images of the partial areas 151 shot with the high-speed camera 121 are deformed into trapezoidal shapes depending on the shooting positions, and the states of the deformation vary depending on the shooting positions. Thus, at the time of shooting a certain partial area 151 with the high-speed camera 121, from an image shot with the high-speed camera 121 in a shooting direction in which the optical axis of the camera passes through the center of the partial area 151 specified by XYZ coordinate values of the partial area 151, an area corresponding to an image of the partial area shot with the wide-angle camera 120 is extracted as a partial area image. To be specific, an image of a partial area shot with the wide-angle camera 120 is set as a reference image, and some feature points (edges, corners, and so on) are extracted from the reference image. Next, an image shot with the high-speed camera 121 is set as an original image, and corresponding points that correspond to the feature points are detected from the original image. There are various methods for detecting corresponding points, and a typical one is, for example, the Lucas-Kanade method. Next, a deformation parameter for geometrically deforming the original image is calculated so that most of the corresponding points and the feature points overlap. For example, a projective transformation parameter is calculated as the deformation parameter. Next, the original image is deformed and aligned using the obtained projective transformation parameter. Then, an area corresponding to the reference image is extracted as a partial area image from the aligned original image. The extracted partial area image is stored in the storing unit 117 as the high-speed camera image 1176.

Figure 8:
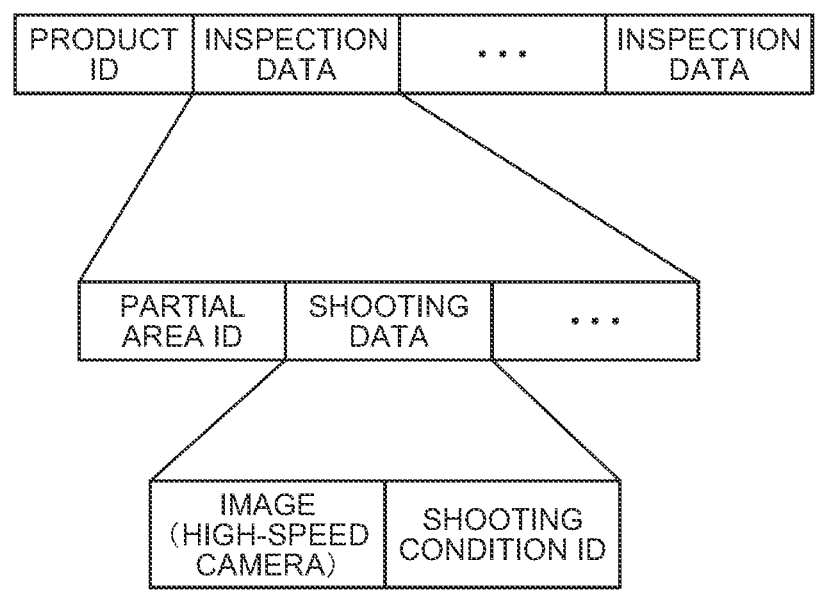
FIG. 8 is a view showing a format example of an inspection image in the inspection apparatus according to the first example embodiment of the present invention.

The inspection image 1177 is an image for inspection selected from the high-speed camera image 1176. FIG. 8 shows an example of a format of the inspection image 1177. The inspection image 1177 of this example includes a product ID and inspection data of each partial area 151. Inspection data corresponding to one partial area 151 includes a partial area ID and one or more shooting data. One shooting data includes a partial area image and a shooting condition ID.

Figure 9:
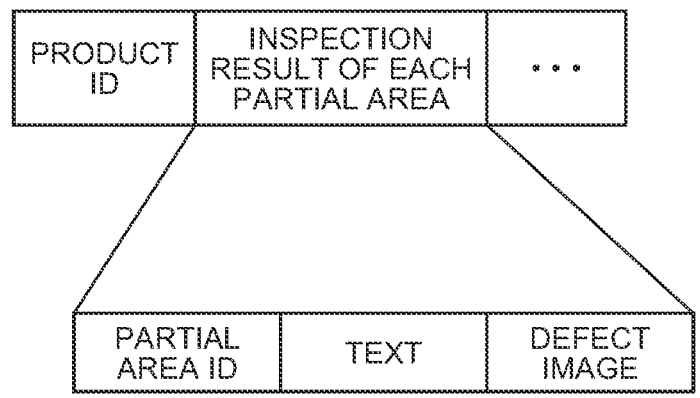
FIG. 9 is a view showing an example of a format of an inspection result in the inspection apparatus according to the first example embodiment of the present invention.

The inspection result 1178 is data showing the result of an inspection. FIG. 9 shows an example of a format of the inspection result 1178. The inspection result 1178 of this example includes a product ID and an inspection result of each partial area. An inspection result corresponding to one partial area 151 includes a partial area ID, a text showing the presence or absence of a defect such as a flaw, and a defect image emphasizing the defect such as the flaw. The defect image is an image in which an anomalous portion such as a flaw detected from the inspection image 1177 is emphasized by coloring with a color different from the background or thickening.

The arithmetic processing unit 118 has a processor such as an MPU and a peripheral circuit thereof, and is configured to, by loading the program 1171 from the storing unit 117 and executing the program 1171, make the hardware cooperate with the program 1171 and realize various processing units. Major processing units realized by the arithmetic processing unit 118 are a conveyor belt control unit 1181, a robot arm control unit 1182, a wide-angle camera image acquiring unit 1183, a shooting condition selecting unit 1184, a high-speed camera image acquiring unit 1185, an anomaly detecting unit 1186, and an effectiveness updating unit 1187.

The conveyor belt control unit 1181 is configured to send out a control signal to the conveyor belt 140 through the conveyor belt I/F unit 111 and thereby control the movement of the conveyor belt 140.

The robot arm control unit 1182 is configured to send out control signals to the robot arms 130 to 132 through the robot arm I/F units 112-1 to 112-3 and thereby control the movements of the robot arms 130 to 132.

The wide-angle camera image acquiring unit 1183 is configured to control the movement of the robot arm 130 through the robot arm control unit 1182 and thereby adjust the position and shooting direction of the wide-angle camera 120. The wide-angle camera image acquiring unit 1183 is also configured to, by sending out a command to the wide-angle camera 120 through the camera IN unit 113-1, acquire an image of the product 150 with the wide-angle camera 120, generate the wide-angle camera image 1172, and store the wide-angle camera image 1172 into the storing unit 117. In generating the wide-angle camera 1172, the wide-angle camera image acquiring unit 1183 inputs a product ID from the communication I/F unit 114 or the operation input unit 115, divides an image to generate images of the respective division areas, and generates partial area IDs by automatic numbering.

The shooting condition selecting unit 1184 is configured to, in an initial state, select all the shooting conditions stored in the pre-learning shooting condition table 1173 stored in the storing unit 117. The shooting condition selecting unit 1184 is also configured to, every time inspection of one product 150 ends and update of the effectiveness table 1174 by the effectiveness updating unit 1187 ends, determine for each partial area 151 whether or not a predetermined condition is established. For example, the predetermined condition is a condition that the total number of the products 150 inspected using the pre-learning shooting condition table 1173 exceeds a number set in advance. The total number may be the same in all the partial areas, or may be different. However, the predetermined condition is not limited to the above. For example, the predetermined condition may be a condition that the total number of shooting conditions with effectiveness of 1 or more has hardly changed in a given number of products 150. Alternatively, the predetermined condition may be a condition that a given time has passed after use of the pre-learning shooting condition table 1173. In addition, as the abovementioned predetermined condition, any condition may be used as long as it determines an end-of-learning condition. Then, the shooting condition selecting unit 1184 is configured to extract a shooting condition with effectiveness of 1 or more from the pre-learning shooting condition table 1173 for the partial area 151 in which the predetermined condition is satisfied, generate the post-learning shooting condition table 1175 including the extracted shooting condition, and store the post-learning shooting condition table 1175 into the storing unit 117. The shooting condition selecting unit 1184 is also configured to select all the shooting conditions from the post-learning shooting condition table 1175 instead of the pre-learning shooting condition table 1173 for the partial area 151 for which the post-learning shooting condition table 1175 has been generated.

The high-speed camera image acquiring unit 1185 is configured to control the movements of the robot arms 131 to 132 through the robot arm control unit 1182 and thereby acquire an image captured by the high-speed camera 121 of the partial area 151 of the product 150 under each shooting condition selected by the shooting condition selecting unit 1184 and store the image into the storing unit 117.

The anomaly detecting unit 1186 is configured to select one or more images suitable for inspection for each partial area 151 from the high-speed camera image 1176 stored in the storing unit 117 and store the image as the inspection image 1177 into the storing unit 117. Various criteria can be considered for determining whether or not the image is suitable for inspection. For example, since a flaw of the surface of the product 150 has an intensity distribution in a high-frequency region on an image, the anomaly detecting unit 1186 selects an image having an intensity distribution in the high-frequency region as an image suitable for inspection. Moreover, the anomaly detecting unit 1186 selects an image that has good contrast and does not cause saturation, which occurs because a camera input exceeds a limit light amount due to reflected light from an object, as an image suitable for inspection. On the other hand, the anomaly detecting unit 1186 excludes an image having poor contrast and an image causing the saturation from an image suitable for inspection. However, the criteria for selecting an inspection image are not limited to the above.

Further, the anomaly detecting unit 1186 is configured to detect an anomaly in each partial area 151 based on the inspection image 1177. Various methods can be considered for detecting an anomaly such as a flaw from the inspection image 1177. For example, the anomaly detecting unit 1186 compares each small unit made of some pixels with the surroundings, and detects a change point of density as a flaw. However, the method for detecting an anomaly from the inspection image 1177 is not limited to the above. Any other method, such as a method of comparing an inspection image with a reference image having no anomaly such as a flaw and thereby detecting an anomaly, can be used.

Further, the anomaly detecting unit 1186 is configured to generate the inspection result 1178 indicating the presence or absence of a flaw or the like for each partial area 151, and store the inspection result 1178 into the storing unit 117. The anomaly detecting unit 1186 is also configured to generate an anomaly detection result of the product 150 from the inspection result 1178 of all the partial areas 151 of the product 150, outputs to the screen display unit 116, or/and transmit to an external terminal through the communication IN unit 114.

The effectiveness updating unit 1187 is configured to update the effectiveness table 1174 based on the inspection image 1177 of the product 150. The effectiveness updating unit 1187 retrieves inspection data corresponding to a partial area of the product 150 having been inspected from the inspection image 1177, extracts the partial area ID and all the shooting condition IDs from the inspection data, and executes the following processing. That is to say, the effectiveness updating unit 1187 increments by 1 the effectiveness of an entry of the effectiveness table 1174 specified by the extracted partial area ID and shooting condition IDs. The effectiveness updating unit 1187 repeatedly executes the same processing for all the shooting condition IDs.

Figure 10:
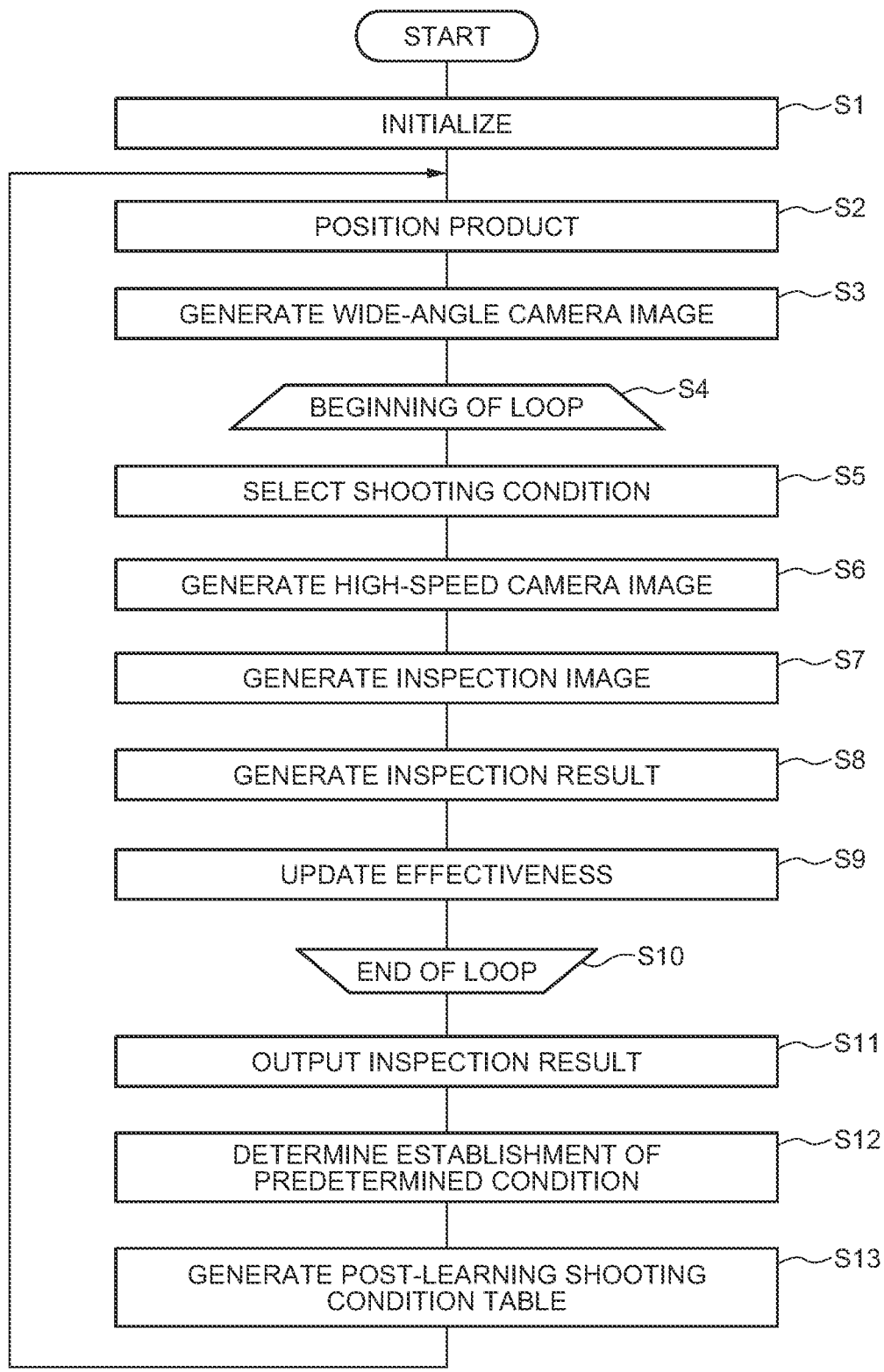
FIG. 10 is a flowchart showing an example of an operation of the inspection apparatus according to the first example embodiment of the present invention.

FIG. 10 is a flowchart showing an example of an operation of the inspection apparatus 100. Below, the operation of the inspection apparatus 100 will be described with reference to FIG. 10.

When the computer 110 of the inspection apparatus 100 is activated, the computer 110 first executes an initialization process (step S1). In this initialization process, the computer 110 loads the pre-learning shooting condition table 1173 into the storing unit 117 through an external input interface such as the communication I/F unit 114, and initializes the wide-angle camera image 1172, the effectiveness table 1174, the post-learning shooting condition table 1175, the high-speed camera image 1176, the inspection image 1177, and the inspection result 1178. Moreover, the shooting condition selecting unit 1184 selects the pre-learning shooting condition table 1173 as a shooting condition table to be actually used.

Next, the conveyor belt control unit 1181 of the computer 110 controls the conveyor belt 140 and thereby positions one product 150 in a predetermined place (step S2).

Next, the wide-angle camera image acquiring unit 1183 of the computer 110 generates the wide-angle camera image 1172 and stores the wide-angle camera image 1172 into the storing unit 117 (step S3). The details of step S3 is as follows. First, the wide-angle camera image acquiring unit 1183 controls the movement of the robot arm 130 through the robot arm control unit 1182 to move the wide-angle camera 120 to a predetermined position above the product 150, and sends out a command to the wide-angle camera 120 to acquire an image of the product 150. Next, after acquiring the image, the wide-angle camera image acquiring unit 1183 controls the movement of the robot arm 130 through the robot arm control unit 1182 and thereby moves the wide-angle camera 120 to a position not to avoid the movements of the high-speed camera 121 and the illuminator 122. Next, the wide-angle camera image acquiring unit 1183 divides the acquired image to generate images of a plurality of partial areas, generates the wide-angle camera image 1172 having an ID of the product 150 and the image, partial area ID and coordinate values of each of the partial areas, and stores into the storing unit 117.

Next, the computer 110 repeats step S5 to step S9 by the number of the partial areas (step S4, S10). A partial area that is actually being processed will be referred to as a partial area of interest hereinafter.

At step S5, the shooting condition selecting unit 1184 selects all shooting conditions from the pre-learning shooting condition table 1173 that is a shooting condition table to be actually used for the partial area of interest.

At step S6, the high-speed camera image acquiring unit 1185 acquires an image of the partial area of interest of the product 150 under each of the shooting conditions selected by the shooting condition selecting unit 1184, generates the high-speed camera image 1176, and stores into the storing unit 117. At this time, the high-speed camera image acquiring unit 1185 executes processing such as positing with an image of the partial area of interest shot with the wide-angle camera 120 as mentioned above.

At step S7, the anomaly detecting unit 1186 selects an image for inspection from the high-speed camera image 1176, and stores as the inspection image 1177 into the storing unit 117. At step S8, the anomaly detecting unit 1186 detects an anomaly in the partial area of interest based on the inspection image 1177, and stores the inspection result 1178 corresponding to the partial area of interest into the storing unit 117. At step S9, the effectiveness updating unit 1187 increments an effectiveness corresponding to the shooting condition of the high-speed camera image used for the inspection of the partial area of interest based on the inspection image 1177.

Next, the anomaly detecting unit 1186 of the computer 110 retrieves the inspection result 1178 of all the partial areas 151 of the product 150 from the storing unit 117, generates an anomaly detection result of the product 150 based on the retrieved inspection result 1178, outputs to the screen display unit 116, or/and transmits to an external terminal through the communication I/F unit 114 (step S11).

Next, the shooting condition selecting unit 1184 of the computer 110 determines whether or not a predetermined condition is established for each of the partial areas (step S12). Next, the shooting condition selecting unit 1184 generates, for the partial area where the predetermined condition is established, the post-learning shooting condition table 1175 based on the effectiveness table 1174 (step S13). For the partial area where the predetermined condition is established, the post-learning shooting condition table 1175 is selected as a shooting condition table to be actually used thereafter. On the other hand, for the partial area where the predetermined condition is not established, the pre-learning shooting condition table 1173 remains selected as a shooting condition table to be actually used.

After that, the computer 110 returns to step S2 in order to perform inspection of a next product 150, and repeats the same processing as the abovementioned processing for the next product 150.

Subsequently, an operation example of the high-speed camera image acquiring unit 1185 performed at step S6 will be described.

Operation Example 1

The high-speed camera image acquiring unit 1185 classifies shooting conditions selected by the shooting condition selecting unit 1184 into shooting condition groups in each of which the irradiation angle (i.e., the position of the illuminator 122) is the same and the shooting angles (i.e., the positions of the high-speed camera 121) are mutually different.

Figure 11:
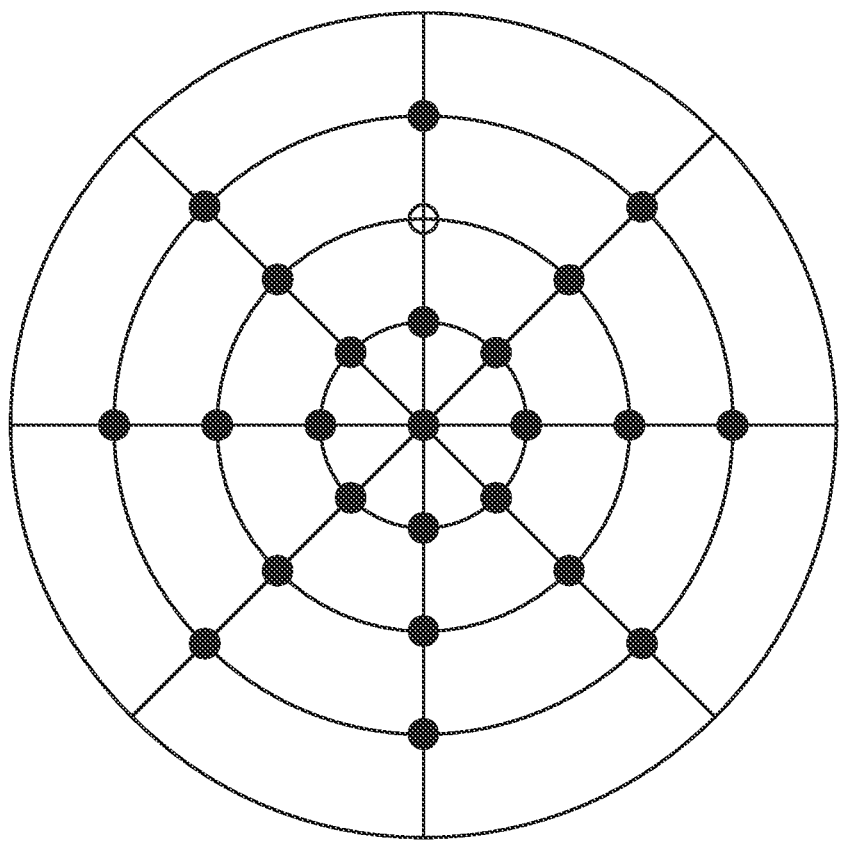
FIG. 11 is a schematic view for describing an example of a group of shooting conditions with the same irradiation angle and mutually different shooting angles.

FIG. 11 is a schematic view for describing one group when shooting conditions selected by the shooting condition selecting unit 1184 are classified into shooting condition groups in each of which the irradiation angle is the same and the shooting angles are mutually different. As with FIG. 5, FIG. 11 is a view seen from above showing a virtual hemisphere that is centered on the partial area 151 to be inspected of the product 150 and has an equatorial plane parallel to the upper surface of the product 150, on which longitude lines and latitude lines are drawn. For the sake of simplicity, the longitude lines and the latitude lines are drawn at coarse intervals. Moreover, in FIG. 11, a white circle is drawn at a spot where the illuminator 122 is placed, and a black circle is drawn at a spot where the high-speed camera 121 is placed.

Figure 12:
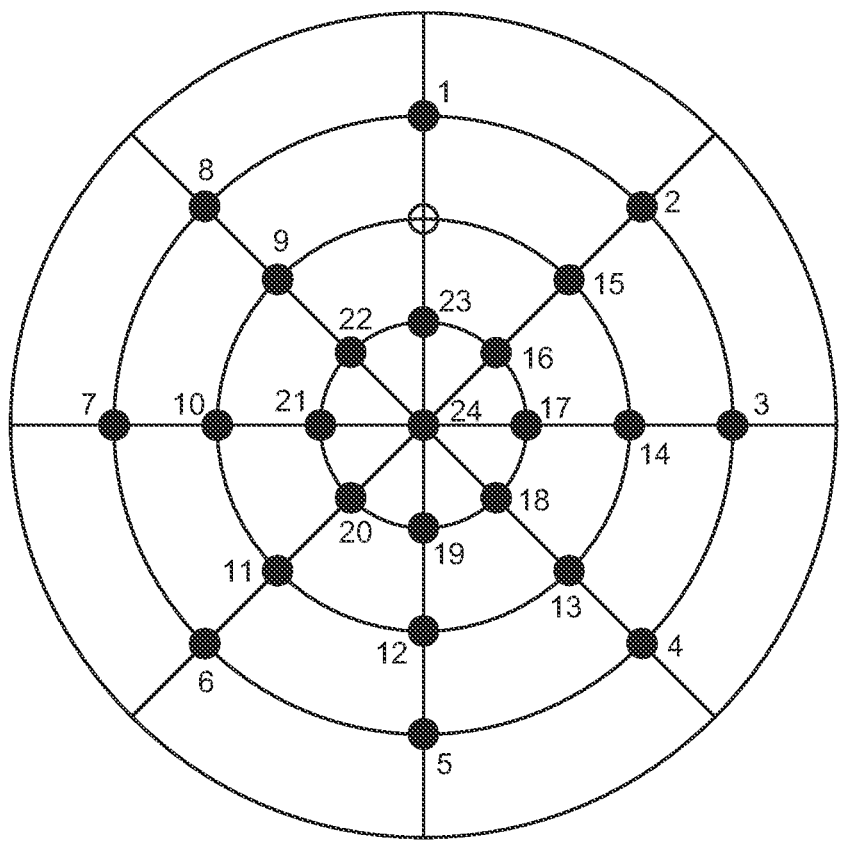
FIG. 12 is a view showing an example of a movement route of a high-speed camera in processing the group of shooting conditions with the same irradiation angle and mutually different shooting angles.

Next, the high-speed camera image acquiring unit 1185 determines, for each of the abovementioned groups, the order of switching to the respective shooting angles of the selected shooting conditions so that a relative movement amount of the high-speed camera 121 to the product 150 is minimized in a state in which the irradiation angle is fixed to the irradiation angle of the group by controlling the robot arm control unit 1182. For example, in respect of the group shown in FIG. 11, the high-speed camera image acquiring unit 1185 determines the movement route of the high-speed camera 121 such that the camera moves through the intersections, for example, in an order as shown in FIG. 12.

Next, the high-speed camera image acquiring unit 1185 controls, for each of the abovementioned groups, the robot arm control unit 1182 so that the high-speed camera 121 moves on the determined movement route with the shooting direction kept toward the center of the hemisphere at all times. Then, the high-speed camera image acquiring unit 1185 acquires an image of the partial area 151 of the product 150 by releasing the shutter of the high-speed camera 121 at a timing that the shooting angle matches the shooting angle of the shooting condition (that is, a timing that the high-speed camera 121 passes through the intersection). For example, in a case where the movement route as shown in FIG. 12 is determined, the high-speed camera image acquiring unit 1185 moves the high-speed camera 121 along the movement route by controlling the robot arm control unit 1182 in a state that the illuminator 122 is fixed at a while circle spot shown in FIG. 12 by controlling the robot arm control unit 1182. Then, the high-speed camera image acquiring unit 1185 releases the shutter of the high-speed camera 121 at a timing that the high-speed camera 121 passes through a black circle spot shown in FIG. 12.

The high-speed camera image acquiring unit 1185 determines the order to process the abovementioned groups so that a relative movement amount of the illuminator 122 to the product 150 becomes minimum. For example, the high-speed camera image acquiring unit 1185 determines the movement route of the illuminator 122 so that a relative movement amount of the illuminator 122 to the product 150 becomes minimum, and determines the position of the illuminator 122 (that is, a group to process next) in accordance with the determined movement route.

Operation Example 2

The high-speed camera image acquiring unit 1185 classifies shooting conditions selected by the shooting condition selecting unit 1184 into shooting condition groups in each of which the shooting angle (i.e., the position of the high-speed camera 121) is the same and the irradiation angles (i.e., the positions of the illuminator 122) are mutually different.

Figure 13:
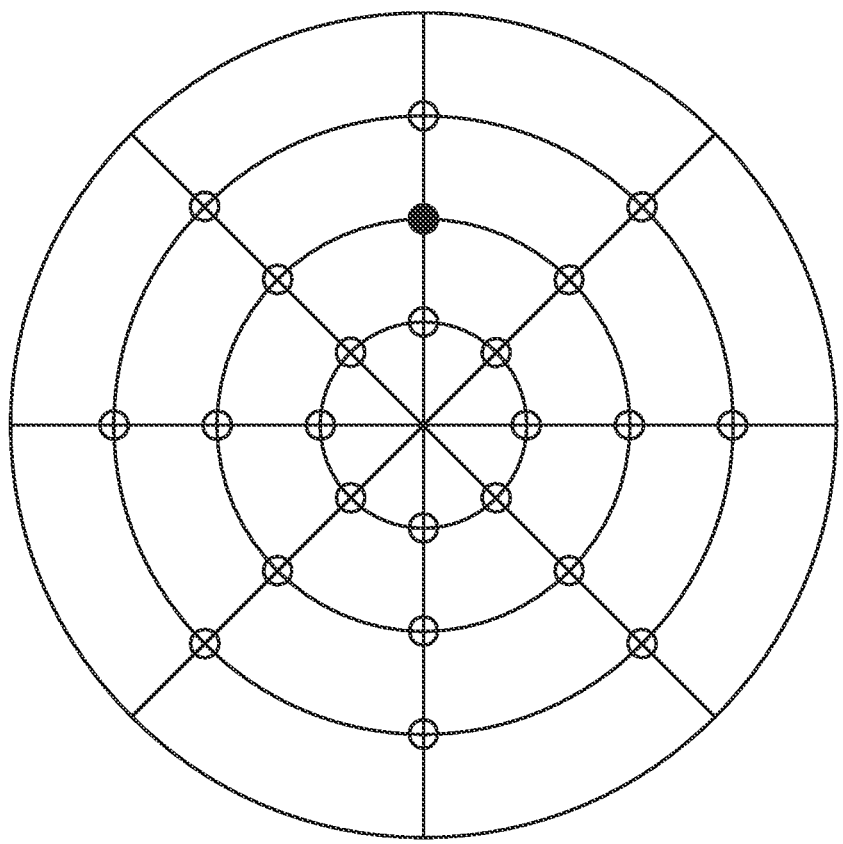
FIG. 13 is a schematic view for describing an example of a group of shooting conditions with the same shooting angle and mutually different irradiation angles.

FIG. 13 is a schematic view for describing one group when shooting conditions selected by the shooting condition selecting unit 1184 are classified into shooting condition groups in each of which the shooting angle is the same and the irradiation angles are mutually different. In FIG. 13, a white circle is drawn at a spot where the illuminator 122 is placed, and a black circle is drawn at a spot where the high-speed camera 121 is positioned.

Figure 14:
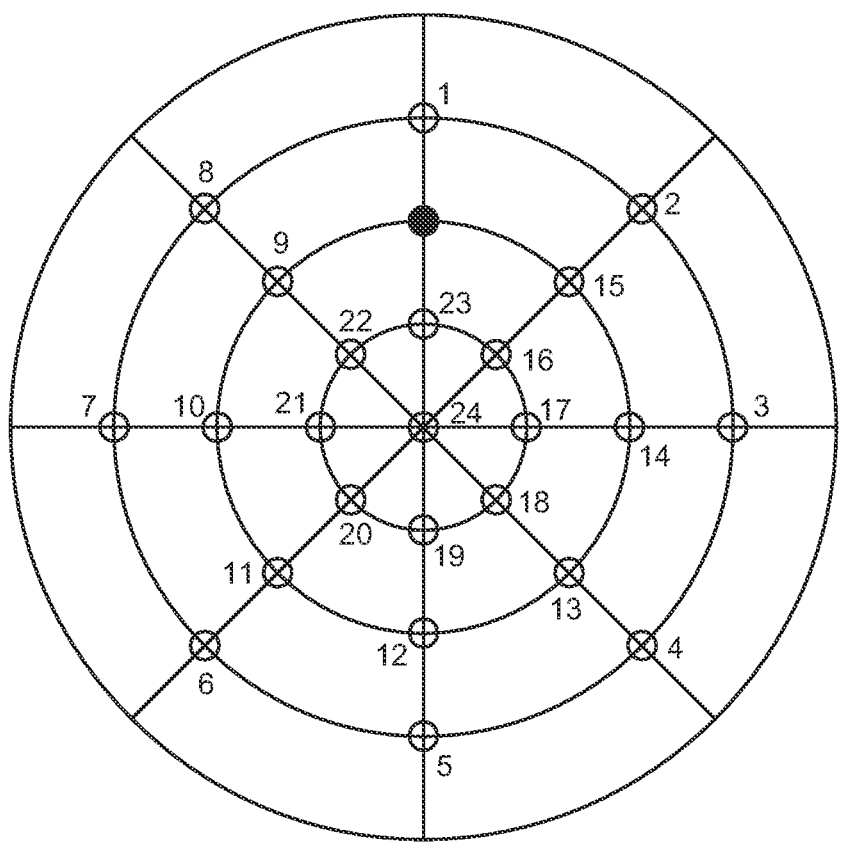
FIG. 14 is a view showing an example of a movement route of an illuminator in processing the group of shooting conditions with the same shooting angle and mutually different irradiation angles.

Next, the high-speed camera image acquiring unit 1185 determines, for each of the abovementioned groups, the order of switching to the respective irradiation angles of the selected shooting conditions so that a relative movement amount of the illuminator 122 to the product 150 becomes minimum in a state in which the shooting angle is fixed to the shooting angle of the group by controlling the robot arm control unit 1182. For example, in respect of the group shown in FIG. 13, the high-speed camera image acquiring unit 1185 determines the movement route of the illuminator 122 such that the illuminator 122 moves through the intersections in an order as shown in FIG. 14, for example.

Next, the high-speed camera image acquiring unit 1185 controls, for each of the abovementioned groups, the robot arm control unit 1182 so that the illuminator 122 moves on the determined movement route with the irradiation direction kept toward the center of the hemisphere at all times. Then, the high-speed camera image acquiring unit 1185 acquires an image of the partial area 151 of the product 150 by releasing the shutter of the high-speed camera 121 at a timing that the irradiation angle matches the irradiation angle of the shooting condition (that is, a timing that the illuminator 122 passes through the intersection). For example, in a case where a movement route as shown in FIG. 14 is determined, the high-speed camera image acquiring unit 1185 moves the illuminator 122 along the movement route by controlling the robot arm control unit 1182 in a state that the high-speed camera 121 is fixed at a black circle spot shown in FIG. 14 by controlling the robot arm control unit 1182. Then, the high-speed camera image acquiring unit 1185 releases the shutter of the high-speed camera 121 at a timing that the illuminator 122 passes through a white circle spot shown in FIG. 14.

The high-speed camera image acquiring unit 1185 determines the order to process the abovementioned groups so that a relative movement amount of the high-speed camera 121 to the product 150 becomes minimum. For example, the high-speed camera image acquiring unit 1185 determines a movement route of the high-speed camera 121 so that a relative movement amount of the high-speed camera 121 to the product 150 becomes minimum, and determines the position of the high-speed camera 121 (that is, a group to process next) in accordance with the determined movement route.

As described above, according to this example embodiment, it is possible to accurately inspect the surface of the product 150 for an anomaly like a flaw. The reason is that inspection is performed based on images obtained by shooting the product 150 under various shooting conditions with different directions to illuminate the product 150 and directions to shoot the product 150. Thus, the inspection allows highly accurate detection of an anomaly like a fine flaw as compared with inspection performed with illumination and camera posture of predetermined one direction.

Further, according to this example embodiment, even if the types of shooting conditions increase, it is possible to prevent a time required for the inspection from increasing proportionally. The reason is that by selecting an image suitable for the inspection from images acquired under each shooting condition and incrementing the effectiveness of the shooting condition of the selected image, a shooting condition suitable for the inspection is learned and one or a plurality of shooting conditions suitable for the inspection are selected from among various initial shooting conditions based on the effectiveness of each shooting condition. Moreover, since the high-speed camera 121 that can shoot a large number of images per second is used as a camera for detecting an anomaly of an inspection surface of the product 150, it is possible to shoot the inspection surface of the product 150 while switching shooting conditions at high speeds. Moreover, according to this example embodiment, in an object inspection to be executed before a predetermined condition is satisfied, the effectiveness is updated while the inspection is performed under various shooting conditions, so that pre-adjustment to be performed before the inspection is unnecessary.

In this example embodiment, various additions and changes as shown below are possible.

In this example embodiment, a shooting condition is determined by two parameters; a shooting direction (a shooting angle) of the high-speed camera 121 with respect to a partial area of the product 150 to be inspected, and an illumination direction (an irradiation angle) of the illuminator 122. However, a shooting condition may be determined by one or more other parameters in addition to the shooting angle and the irradiation angle. The other parameters include the intensity of an illumination light. Alternatively, the other parameters include the wavelength band of the illumination light, the presence or absence of indirect illumination, the presence or absence of direct illumination, and the like.

Further, in this example embodiment, the shooting angle of the high-speed camera 121 with respect to an inspection surface of the product 150 and the irradiation angle of the illuminator 122 are adjusted by changing the positions and postures thereof. However, by fixing the positions and postures of the high-speed camera 121 and the illuminator 122 and adjusting the posture of the product 150, the shooting angle of the high-speed camera 121 with respect to the inspection surface of the product 150 and the irradiation angle of the illuminator 122 may be adjusted. Alternatively, the positions and postures of the high-speed camera 121, the illuminator 122, and the product 150 may be changed, respectively.

Further, in this example embodiment, the high-speed camera 120 is used to detect an anomaly of the inspection surface of the product 150, but another type of camera such as an infrared camera may be used instead of the high-speed camera 120.

Further, in this example embodiment, the inspection is performed for each of partial areas obtained by dividing the upper surface of the product 150. However, in a case where the size of the upper surface of the product 150 is small, the entire upper surface of the product 150 can be inspected as one partial area. Moreover, it is possible to inspect only some of the partial areas of the upper surface of the product 150. In this case, the wide-angle camera 120 may be omitted.

Second Example Embodiment

Figure 15:
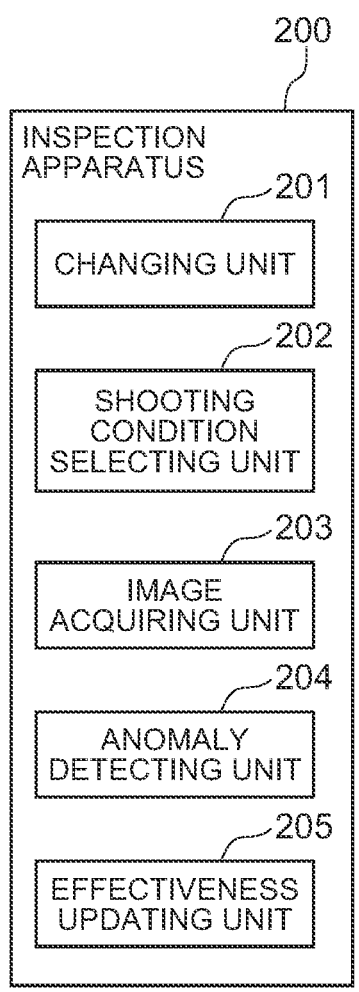
FIG. 15 is a block diagram of an inspection apparatus according to a second example embodiment of the present invention.

Next, a second example embodiment of the present invention will be described with reference to FIG. 15. FIG. 15 is a block diagram of an inspection apparatus 200 according to this example embodiment. In this example embodiment, the overview of the inspection apparatus of the present invention will be described.

Referring to FIG. 15, the inspection apparatus 200 according to this example embodiment includes a changing unit 201, a shooting condition selecting unit 202, an image acquiring unit 203, an anomaly detecting unit 204, and an effectiveness updating unit 205.

The changing unit 201 is configured to change a condition for shooting an object to various shooting conditions. The changing unit 201 can be configured, for example, in the same manner as the robot arms 131 and 132 and the robot arm control unit 1182 shown in FIG. 1, but is not limited thereto.

The shooting condition selecting unit 202 is configured to select all of the various shooting conditions in inspection of the object executed before a predetermined condition is established, and select one or a plurality of shooting conditions from the various shooting conditions based on effectiveness of each of the shooting conditions in inspection of the object executed after the predetermined condition is established. The shooting condition selecting unit 202 can be configured, for example, in the same manner as the shooting condition selecting unit 1184 shown in FIG. 1, but is not limited thereto.

The image acquiring unit 203 is configured to control the changing unit 201 and thereby acquire an image of the object under each of the selected shooting conditions. The image acquiring unit 203 can be configured, for example, in the same manner as the high-speed camera image acquiring unit 1185 shown in FIG. 1, but is not limited thereto.

The anomaly detecting unit 204 is configured to detect an anomaly of the object based on the image acquired by the image acquiring unit 203. The anomaly detecting unit 204 can be configured, for example, in the same manner as the anomaly detecting unit 1186 shown in FIG. 2, but is not limited thereto.

The effectiveness updating unit 205 is configured to update the effectiveness based on the image acquired by the image acquiring unit 203. To be specific, the effectiveness updating unit 205 is configured to update the effectiveness so that the effectiveness of the shooting condition when an image suitable for the inspection among the images acquired by the image acquiring unit 203 has been captured becomes more effective as compared with the effectiveness of the shooting condition unsuitable for the inspection. The effectiveness updating unit 205 can be configured, for example, in the same manner as the effectiveness updating unit 1187 shown in FIG. 2, but is not limited thereto.

The inspection apparatus 200 thus configured operates in the following manner. First, the shooting condition selecting unit 202 selects all of various shooting conditions in inspection of the object executed before a predetermined condition is established, and selects one or a plurality of shooting conditions from the various shooting conditions based on effectiveness of each of the shooting conditions in inspection of the object executed after the predetermined condition is established. Next, the image acquiring unit 203 controls the changing unit 201 and thereby acquires an image of the object under each of the shooting conditions selected by the shooting condition selecting unit 202. Next, the anomaly detecting unit 204 detects an anomaly of the object based on the image acquired by the image acquiring unit 203. Moreover, the effectiveness updating unit 205 updates the effectiveness based on the image acquired by the image acquiring unit 203.

With the configurations and operations as described above, this example embodiment can increase the accuracy of inspection, shorten the average inspection time, and reduce the pre-adjustment cost. The reason is that the inspection apparatus 200 selects all of various shooting conditions in inspection of an object performed before a predetermined condition is established, and selects one or a plurality of shooting conditions from the various shooting conditions based on effectiveness of each of the shooting conditions in inspection of the object after the predetermined condition is established. That is to say, the reason why increase of the accuracy of the inspection can be realized is that in the inspection of the object performed before the predetermined condition is established, the inspection is carried out under the various shooting conditions and, in the inspection of the object performed after the predetermined condition is established, the inspection is performed under the shooting condition suitable for the inspection based on the effectiveness updated in the inspections performed so far. Moreover, the reason why the average inspection time is shortened is that in the inspection of the object performed after the predetermined condition is established, the inspection is performed under the shooting condition suitable for the inspection based on the effectiveness updated in the inspections performed so far. Moreover, the reason why the pre-adjustment cost is reduced is that in the inspection of the object performed before the predetermined condition is satisfied, the effectiveness is updated while inspection is performed under the various shooting conditions, so that the pre-adjustment is unnecessary.

Although the present invention has been described above with reference to the example embodiments, the present invention is not limited to the above example embodiments. The configurations and details of the present invention can be changed in various manners that can be understood by one skilled in the art within the scope of the present invention.

The present invention can be used in all fields of inspecting an object such as an industrial product and a part for a flaw and so on.

DESCRIPTION OF NUMERALS

100 inspection apparatus
110 computer
120 wide-angle camera
121 high-speed camera
122 illuminator
130-132 robot arm
130*a*-132*a* joint
130*b*-132*b* arm
140 conveyor belt
150 product
151 partial area

The invention claimed is:
1. An inspection apparatus comprising:
a memory containing program instructions; and
a processor coupled to the memory, wherein the processor is configured to execute the program instructions to:
divide an image of an inspection surface of a product shot with a first imaging unit into a plurality of partial area images;
for each of a plurality of partial areas respectively corresponding to the partial area images, acquire, as a narrow-angle partial area image, an image of the partial area shot with a second imaging unit with a narrower angle than the first imaging unit under various shooting conditions in a pre-learning shooting condition table in which the various shooting conditions and shooting condition IDs uniquely identifying the various shooting conditions are set in advance;
for each of the partial areas, select the narrow-angle partial area image suitable for inspection from among the acquired narrow-angle partial area images, generate an inspection image including the selected narrow-angle partial area image and the shooting condition ID used for shooting the selected narrow-angle partial area image, and detect an anomaly of the inspection surface of the product based on the inspection image;
for each of the partial areas, determine whether or not each of the various shooting conditions is effective based on a frequency of the shooting condition ID included by the inspection image; and for each of the partial areas, determine whether or not a predetermined condition is established and, with respect to the partial area in which the predetermined condition is established, generate a post-learning shooting condition table in which only the various shooting condition determined to be effective among the various shooting conditions is set.

2. The inspection apparatus according to claim 1, wherein the processor is configured to execute the program instructions to:

for each of the partial areas, in shooting of the partial area as specified by coordinate values, extract an area corresponding to the image of the partial area shot with the first imaging unit as the narrow-angle partial area image from the image shot with the second imaging unit in a shooting direction in which an optical axis of the second imaging unit passes through a center of the partial area specified by the coordinate values.

3. The inspection apparatus according to claim 2, wherein the processor is configured to execute the program instructions to:

for each of the partial areas, in the extraction of the narrow-angle partial area image, use the image of the partial area shot with the first imaging unit as a reference image, extract a plurality of feature points from the reference image, use an image shot with the second imaging unit as an original image, detect a corresponding point that corresponds to the feature point from the original image, calculate a projective transformation parameter for geometrically transforming the original image so that the corresponding point and the feature point overlap, position the original image using the calculated projective transformation parameter, and extract an area corresponding to the reference image as the narrow-angle partial area image from the original image after positioning.

4. The inspection apparatus according to claim 1, wherein each of the various shooting conditions includes a shooting angle of the second imaging unit and an illumination angle of an illumination device illuminating the product.

5. The inspection apparatus according to claim 4, wherein the processor is configured to execute the program instructions to:

for each of the partial areas, in shooting of the partial area with the second imaging unit under the various shooting conditions, determine an order of the various shooting conditions so that a relative movement amount of the second imaging unit to the product becomes minimum, and perform the shooting while sequentially switching the various shooting conditions in accordance with the determined order.

6. The inspection apparatus according to claim 4, wherein the processor is configured to execute the program instructions to:

for each of the partial areas, in shooting of the partial area with the second imaging unit under the various shooting conditions, determine an order of the various shooting conditions so that a relative movement amount of the illumination device to the product becomes minimum, and sequentially perform the shooting while switching the various shooting conditions in accordance with the determined order.

7. The inspection apparatus according to claim 4, wherein the processor is configured to execute the program instructions to:

for each of the partial areas, in shooting of the partial area with the second imaging unit under the various shooting conditions, classify the various shooting conditions into shooting condition groups in which the illumination angle is the same and the shooting angles is different and, for each of the groups, sequentially change the shooting angle in a state in which the illumination angle is fixed to the illumination angle of the group, and shoot the image of the partial area with the second imaging unit at timings when the shooting angle of the second imaging unit matches the shooting angle of the group.

8. The inspection apparatus according to claim 4, wherein the processor is configured to execute the program instructions to:

for each of the partial areas, in shooting of the partial area with the second imaging unit under the various shooting conditions, classify the various shooting conditions into shooting condition groups in which the shooting angle is the same same and the illumination angle is different and, for each of the groups, sequentially change the illumination angle in a state in which the shooting angle is fixed to the shooting angle of the group, and shoot the image of the partial area with the second imaging unit at timings when the illumination angle of the illumination device matches the illumination angle of the group.

9. The inspection apparatus according to claim 1, wherein the processor is configured to, with respect to the partial area for which the post-learning shooting condition table has been generated, use the post-learning shooting condition table instead of the pre-learning shooting condition table in later inspection of the product.

10. An inspection method for sequentially inspecting a plurality of products manufactured by a same manufacturing process, the inspection method comprising, for each of the products:

a process to position the product to inspect;

a process to shoot an entire surface of the product with a first camera with a wide angle;

a process to divide an image of the entire surface obtained by shooting with the first camera into a plurality of wide-angle partial area images having a one-to-one correspondence with a plurality of partial areas obtained by dividing the entire surface into a plurality of areas, and generate a wide-angle camera image having, for each of the partial areas, a set of the wide-angle partial area image, coordinate values of the partial area, and an ID of the partial area;

a process to, for each of the partial areas, shoot the partial area specified by the coordinate values of the partial area on the entire surface of the product with a second camera with a narrower angle than the first camera under various shooting conditions in a pre-learning shooting condition table in which the various shooting conditions and shooting condition IDs uniquely identifying the various shooting conditions are set in advance;

a process to, for each of the partial areas, select a narrow-angle partial area image suitable for inspection from narrow-angle partial area images that are images of partial areas obtained by shooting with the second camera, and generate an inspection image including the selected narrow-angle partial area image and the shooting condition ID used for shooting the narrow-angle partial area image;

a process to detect an anomaly of the entire surface of the product based on the inspection image;

a process to, when inspection of the positioned product has finished, for each of the partial areas, determine effectiveness of each of the various shooting conditions based on a frequency of the shooting condition ID included by the inspection image; and a process to, for each of the partial areas, determine whether or not an end-of-learning condition is established and, with respect to the partial area in which the end-of learning condition is established, generate a post-learning shooting condition table in which only the various shooting condition determined to be effective in determination of the effectiveness among the various shooting conditions is set, wherein with respect to the partial area for which the post-learning shooting condition table has been generated, the post-learning shooting condition table is used instead of the pre-learning shooting condition table in later inspection of the product.

11. A non-transitory computer-readable recording medium storing a program comprising instructions for causing a computer that sequentially inspects a plurality of products manufactured by a same manufacturing process to perform, for each of the products:

a process to position the product to inspect;

a process to shoot an entire surface of the product with a first camera with a wide angle;

a process to divide an image of the entire surface obtained by shooting with the first camera into a plurality of wide-angle partial area images having a one-to-one correspondence with a plurality of partial areas obtained by dividing the entire surface into a plurality of areas, and generate a wide-angle camera image having, for each of the partial areas, a set of the wide-angle partial area image, coordinate values of the partial area, and an ID of the partial area;

a process to, for each of the partial areas, shoot the partial area specified by the coordinate values of the partial area on the entire surface of the product with a second camera with a narrower angle than the first camera under various shooting conditions in a pre-learning shooting condition table in which the various shooting conditions and shooting condition IDs uniquely identifying the various shooting conditions are set in advance;

a process to, for each of the partial areas, select a narrow-angle partial area image suitable for inspection from narrow-angle partial area images that are images of partial areas obtained by shooting with the second camera, and generate an inspection image including the selected narrow-angle partial area image and the shooting condition ID used for shooting the narrow-angle partial area image;

a process to detect an anomaly of the entire surface of the product based on the inspection image;

a process to, when inspection of the positioned product has finished, for each of the partial areas, determine effectiveness of each of the various shooting conditions based on a frequency of the shooting condition ID included by the inspection image; and a process to, for each of the partial areas, determine whether or not an end-of-learning condition is established and, with respect to the partial area in which the end-of learning condition is established, generate a post-learning shooting condition table in which only the various shooting condition determined to be effective in determination of the effectiveness among the various shooting conditions is set, wherein with respect to the partial area for which the post-learning shooting condition table has been generated, the post-learning shooting condition table is used instead of the pre-learning shooting condition table in later inspection of the product.

\* \* \* \* \*